United States Patent [19]

Roelofs

[11] 4,011,358
[45] Mar. 8, 1977

[54] ARTICLE HAVING A COEXTRUDED POLYESTER SUPPORT FILM

[75] Inventor: Glenn E. Roelofs, Oakdale, Minn.

[73] Assignee: Minnesota Mining and Manufacturing Company, Saint Paul, Minn.

[22] Filed: July 23, 1974

[21] Appl. No.: 491,131

[52] U.S. Cl. ............................. 428/287; 428/480; 428/508; 428/511; 428/516; 428/517; 428/518; 428/519; 428/520; 428/910; 428/413; 428/425; 428/447; 427/412; 96/115 P; 428/354; 428/57; 428/49; 428/50; 428/414; 428/284; 40/125 R; 2/93; 274/11 E

[51] Int. Cl.² ................... B32B 27/36; B32B 27/06

[58] Field of Search ................ 117/76 F; 161/252; 428/516–520, 287, 480, 910; 427/412; 96/115 P

[56] References Cited

UNITED STATES PATENTS

| | | | |
|---|---|---|---|
| 2,961,365 | 11/1960 | Sroog | 161/194 X |
| 3,337,364 | 8/1967 | Whitbourne | 117/76 F X |
| 3,515,626 | 6/1970 | Duffield | 428/910 X |
| 3,607,354 | 9/1971 | Krogh et al. | 117/63 X |
| 3,607,616 | 9/1971 | Barbehenn et al. | 161/252 |
| 3,617,352 | 11/1971 | Shima et al. | 117/76 F |
| 3,767,523 | 10/1973 | Schwarz | 161/164 X |
| 3,900,653 | 8/1975 | Riboulet | 428/480 X |

Primary Examiner—P. C. Ives
Attorney, Agent, or Firm—Cruzan Alexander; Donald M. Sell; Richard Francis

[57] ABSTRACT

Coated sheet material having a support film which comprises a biaxially oriented, heat-set coextruded laminate formed from two or more polyester polymers, one layer of the laminate being highly crystalline and the coated layer being tough and non-crystalline. Coatings which normally adhere poorly to a biaxially oriented heat-set highly crystalline monofilm adhere firmly to the laminate. Coated sheet products include pressure-sensitive adhesive tape, lithographic printing plates, splicing tapes, and coated abrasives.

12 Claims, 4 Drawing Figures

4,011,358

ARTICLE HAVING A COEXTRUDED POLYESTER SUPPORT FILM

BACKGROUND OF THE INVENTION

The invention relates to articles having a coextruded biaxially oriented, heat-set polyester support film. More particularly, the invention relates to articles prepared utilizing this support film, e.g., pressure-sensitive tapes, coated abrasive sheet material, butt-splicing tapes for belts such as coated abrasive belts, and lithographic printing plates.

Numerous sheet-like or layered articles which employ a backing layer of a tough flexible material are known. Typical examples include coated abrasive sheets, pressure-sensitive adhesive tapes, photographic film, magnetic recording tape, etc. The backings employed typically include paper, metal foil, cloth, film-forming plastic material, and the like.

Biaxially oriented and heat-set films of highly crystalline polymeric materials such as polyethylene terephthalate (PET), polycyclohexanedimethyl terephthalate (PCDT) and polyethylene naphthalate (PEN) are particularly attractive candidates for coated sheet material backings because of their high tear-resistance, dimensional stability, chemical resistance, wear resistance, strength, abrasion resistance and temperature stability. Such films, however, typically have a smooth, tough, abrasion-resistant, chemical-resistant, dense surface to which conventional adhesive materials bond only with difficulty. Numerous attempts have been made to render the surface of such films more receptive to coatings. While many of these attempts have some merit, none has produced a film which is substantially universally receptive to a wide variety of coating materials.

One method employed to make such films more receptive is to roughen their surfaces by mechanical or chemical means. Mechanical roughening involves making minute cuts into the surface of the film, tending to weaken it structurally. Chemical treatments with strong acids or bases are generally undesirable because they not only tend to degrade the polymer and weaken the film but also are extremely toxic and hazardous to use. A commerically useful chemical treatment of PET film with a non-degrading solvent is disclosed in Krogh et al. U.S. Pat. No. 3,607,354 wherein the chemical treating agent is a hydroxybenzene derivative solvent such as parachlorophenol, but the process requires an extra treating step and necessitates solvent removal.

Another method of making the surface of oriented heat-set films more receptive to coatings is to apply a primer layer of a chemically related but more coating-receptive material by solvent casting or lamination. Because of the unreceptive nature of the surface of biaxially oriented heat-set PET, PCDT and PEN films, even these primer coatings tend to easily delaminate, producing products which have at best, a very short useful life. U.S. Pat. No. 2,961,365 discloses such conventional techniques for coating polyester compositions on biaxially oriented, heat-set PET films.

SUMMARY OF THE INVENTION

In the present invention, a variety of composite coated sheet materials are made on a novel support film which has at least two distinct but firmly united coextruded layers. The support film is biaxially oriented and heat-set and has a highly dimensionally stable base layer formed of a crystalline thermoplastic polyester, especially PEN, PCDT or PET, and a thin layer of a thermoplastic adhesion-promoting polyester. The composite sheet materials are dimensionally stable, strong and tough products which resist delamination under a wide variety of use conditions, and are economical to prepare, avoiding mechanical surface treatment of films, solvent and hazardous chemical handling steps.

Coextrusion is a process for forming composite layers of thermoplastic material, as exemplified by U.S. Pat. No. 3,767,523, and involves simultaneously extruding the constituent layers of a composite film through a die so that the layers meet under laminar flow conditions, intermingling at the interface and becoming firmly united. Such a process, although known for the production of laminated films, has not been known for use in producing composite sheet material of the type described herein.

It has surprisingly been discovered that coextruded biaxially oriented, heat-set polyester backings, where one layer is crystalline PEN, PCDT or PET, and the layer which is to be coated is oriented but less crystalline, are not only flexible, tough, wear-resistant, chemical-resistant, strong, and have the other desirable properties of heat-set, biaxially oriented PET, PCDT or PEN film but also forms a tough, adherent bond with a wide variety of polymeric materials. By contrast, a laminated film made by merely hot melt coating, emulsion coating, or solvent coating the same polyester on the surface of biaxially oriented PET, PCDT or PEN film will produce inferior products which are readily delaminated after being incorporated into a composite article as a support layer. The same is true for multilayered films made by lamination of preformed layers using heat and pressure.

DETAILED DESCRIPTION OF THE INVENTION AND PREFERRED EMBODIMENTS

PET is prepared by reaction of terephthalic acid with ethylene glycol. In this reaction, the acid may be converted to the dimethyl ester which is allowed to react with the glycol by ester interchange. Typically, equimolar amounts of the glycol and the acid are reacted, generally in the presence of an excess of glycol. Minor amounts of another dicarboxylic acid such as isophthalic, phthalic, 2,5- or 2,7- naphthalenedicarboxylic, succinic, sebacic, adipic, azelaic, suberic, pimelic, glutaric, etc., or a diester thereof, e.g., up to 10 mole percent, may be substituted for the terephthalic acid without deleteriously affecting the properties of the resultant composite film. Additionally, minor amounts of another glycol such as 1,3-propanediol, 1,4-butanediol, neopentyl glycol, 1,4-cyclohexanedimethanol, etc., e.g., up to 10 mole percent, may be substituted for the ethylene glycol without deleterious effects.

The preparation of PEN is analogous to the preparation of PET, except that the terephthalic acid is replaced by a free dibasic acid or lower alkyl diester of 2,6-naphthalene dicarboxylic acid. The same minor amounts and types of other dibasic acids or glycols may also be included. The preparation of PCDT is analogous to the preparation of PET except the ethylene glycol is replaced by 1,4-cyclohexane dimethanol and minor amounts of another dibasic acid not terephthalic acid should be present to produce a film which can be biaxially oriented without substantial degradation. For this purpose, the other dibasic acid is present, on a molar basis, typically at least about 10% (preferably at least about 15%).

The thermoplastic adhesion-promoting layer is a polyester which melts below 230° C, does not crystallize rapidly, and is substantially non-crystalline between about 20° and 230° C. "Substantially non-crystalline" means not more than a minor amount of crystallinity between about 20° C and 230° C.

Preferred polyesters for use in the invention, having the properties defined above, may be produced by the condensation reaction of a dicarboxylic acid component consisting of from about 10 to about 100 mole percent of a dicarboxylic acid such as isophthalic acid, hexahydroterephthalic acid, sebacic acid, succinic acid, adipic acid, azelaic acid, suberic acid, pimelic acid, glutaric acid, or mixtures thereof, or the diesters of such acids and correspondingly from 90 to zero mole percent of terephthalic acid, and a glycol component, in substantially equimolar proportions with the dicarboxylic acid component. The glycol is preferably polymethylene glycol having the formula $HO(CH_2)_nOH$, wherein $n$ is an integer of 2–10, e.g., ethylene glycol, 1,3-propanediol and 1,4-butanediol, with ethylene glycol being preferred. Other useful glycols include neopentyl glycol, 1,4-cyclohexane dimethanol and aromatic glycols such as bisphenol A.

As previously stated, the support film is formed by a coextrusion process, wherein the individual layers meet under laminar flow conditions and are expelled from the die as an integral, multi-layer film structure. Coextruded films prepared in this manner look much like monolayer films. Such coextrusion processes are well known as exemplified by aforementioned U.S. Pat. No. 3,767,523 and by U.S. Pat. No. 3,486,196 and No. 3,476,627. Canadian Pat. No. 929,455 discloses the preparation of coextruded films which may be useful in the present invention. The patentee does not, however, suggest that such films be coated with another polymeric layer to provide improved composite articles but rather that it be overlapped and heat-sealed to itself to enclose a comestible.

The freshly coextruded support film, formed as described above, is amorphous. It is thereafter endowed with improved physical properties by biaxial orientation and heat-setting. Biaxial orientation involves stretching the film in two directions normal to each other, generally in the machine direction and at right angles thereto. In a typical operation, the freshly extruded molten film is fed onto a cooling drum to produce a quenched amorphous film which is briefly heated and stretched in the machine direction, and then conducted through a tenter frame where it is stretched transversely with moderate heating. Machine direction stretching may be accomplished by passing between two sets of nip rolls, the second set rotating at a higher speed than the first. Stretching typically increases the film area by a factor of at least 6, the stretching usually being equal in each direction. For applications requiring a higher tensile support film, this factor will be larger, e.g., above 14, and the stretching may be greater in one direction than the other.

Heat-setting, or heat-stabilization of the stretched coextruded film is accomplished by restraining the film in its stretched dimension and heating briefly, then quenching. Such heating is typically in the range of 175° C – 230° C.

Tentering of plastic films or sheet material is illustrated in U.S. Pat. No. 2,823,421.

The coextruded biaxially oriented support film should have a total thickness of at least 1 mil with at least ¼ mil of this thickness being the polyester adhesion-promoting layer. Film thicknesses up to about 10 mils are contemplated for the articles hereinafter described, but thicknesses in excess of 10 mils may be desired for some purposes. The adhesion-promoting layer should not be thicker than ¼ of the total thickness of the coextruded film and preferably is no more than 1 mil thick even for film thicknesses up to 10 mils.

The coextruded support film described above provides a unique backing layer for any of a variety of composite articles requiring a tough, strong, flexible support layer. The thermoplastic adhesion-promoting layer provides a surface which will form an adherent bond with any of a variety of natural or synthetic polymeric materials without the use of prime coatings or surface treatments. The polymeric materials which have been found to adherently bond to this adhesive surface include varnish, silicone polymer, polyurethane, ethylene/vinyl acetate polymers, acrylate polymers, phenolic resins such as phenol formaldehyde, polybutadiene/acrylonitrile polymers, epoxy resins, vinyl chloride/vinyl acetate polymer compositions, styrene/acrylonitrile polymer compositions, cellulose acetate-butyrate compositions, blends of rubbery polymers with tackifying resins, etc.

Upon suitable formulation, each of these polymeric materials can be coated upon the surface adhesion-promoting layer to provide unique products. For example, a pressure-sensitive adhesive tape utilizing tacky, pressure-sensitive adhesive polymeric materials can be provided. Additional products which may be prepared include coated abrasive sheets by using phenolic resin binders for abrasive particles, tough butt-splicing tapes for coated abrasive or other belts by using polyurethane thermosetting layers, and a variety of other novel and useful products, as will be explained hereinafter.

BRIEF DESCRIPTION OF THE DRAWING

The invention will be better understood by referring to the drawing in which like numerals refer to like parts in the various views, all being greatly enlarged fragmentary cross-section views, wherein:

Referring now to the drawings, FIG. 1 depicts an article having a coextruded support film 11 formed of a layer 12 of tough, flexible, dimensionally stable crystalline polyester and a layer 13 of adhesion-promoting polyester. Adherently bonded to the exposed surface of layer 13 is a layer 10 of polymeric material, providing a composite article.

When layer 10 is a pressure-sensitive adhesive composition, a pressure-sensitive adhesive tape is provided. Such compositions, which are generally either elastomers or based upon elastomers, include, among others, polyacrylates, acrylate-acrylic acid copolymers, silicone rubbers, polyurethane, polyvinyl ethers, natural rubbers, and GRS rubbers. Suitable compatible tackifiers, such as rosins, resin esters, etc. may be incorporated to improve adhesive tack. Other conventional additives may also be added to the elastomers such as vulcanizing agents, plasticizers, anti-slumping agents, anti-oxidants, pigments and fillers.

The pressure-sensitive adhesives are aggressively tacky in their normal dry form on tape and have the proper four-fold balance of adhesion, cohesion, stretchiness and elasticity, which permits backing coated therewith to adhere firmly on mere contact with finger pressing, and yet to be stripped back from smooth surfaces to which they are temporarily applied without delamination or offsetting of the adhesive. Certain synthetic polymers and copolymers have a molecular structure such that they inherently have the desired tacky rubbery properties, permitting their direct use, without addition of a tackifying material, as a rubberbased pressure-sensitive adhesive.

The preferred pressure-sensitive adhesives are formed of acrylates which are copolymerized with small proportions of additive copolymerizable monomers having strongly polar groups, viz, acrylic acid, methacrylic acid, acrylamide, methacrylamide, itaconic acid, or mixtures thereof, to provide adhesive masses which in the form of pressure-sensitive adhesive coatings are high in cohesive or internal strength while still retaining a high degree of stickiness or tackiness. Many such adhesives are disclosed in U.S. Pat. No. Re.24,906, the disclosure of which is incorporated herein by reference.

Figure 2:
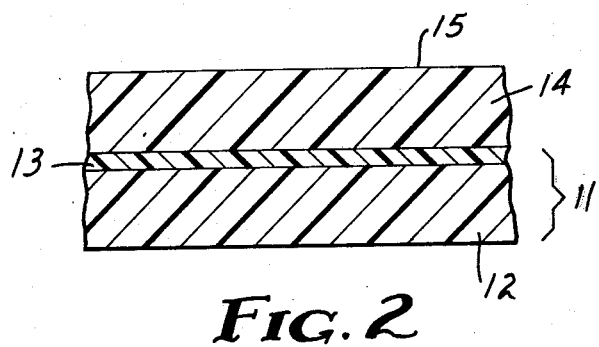
FIG. 2 depicts a lithographic plate according to the invention.

In FIG. 2, support film 11 is overcoated with an ultraviolet light-sensitive layer 14 of the type utilized in the preparation of so called offset lithographic plates. Layer 14 has an ultraviolet light-sensitive surface 15 which, when properly exposed to ultraviolet light, will result in a coating which will be selectively ink-receptive between the imaged and non-imaged areas. One family of ultraviolet light-sensitive material includes the diazonium salts typically utilized in commerical lithographic plates. A description of such salts may be found in U.S. Pat. Nos. 2,714,066 and 3,211,553.

Upon exposure of the light-sensitive coating to ultraviolet light, the coating is rendered differentially soluble between the exposed area and the unexposed area. After the appropriate processing, this surface is selectively ink-receptive and water-repellent. The resultant image is firmly bonded to the surface of the polyester adhesion-promoting layer 13, providing a dimensionally stable, chemical resistant, water-resistant printing plate which can be utilized in conventional offset lithography printing devices. Such a printing plate will withstand long press runs, yielding many thousands of faithful reproductions, even in multi-color work requiring precise registration.

Figure 3:
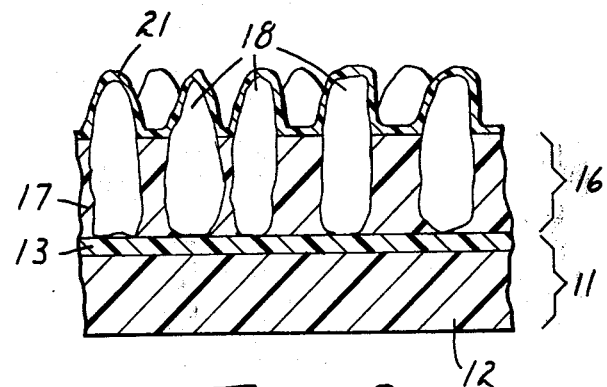
FIG. 3 depicts an abrasive coated sheet product according to the invention.

FIG. 3 shows an abrasive sheet material in accordance with the invention. Abrasive granules 18 are adhered to layer 13 of support film 11 by means of adhesive 16, which may include a conventional "make" coat 17 and a sandsize coat 21. The adhesive binder or "make coat," which may be any suitable resin or varnish binder presently known or suited for use in the manufacture of coated abrasives, optionally contains calcium carbonate or other filler. The resins and varnishes are basically initially liquid phenolics or ureas, but, depending on their use, they may be modified in various ways to give shorter or longer drying times, greater strength, more flexibility or other desirable properties. A preferred binder is a thermosetting adhesive such as phenol-formaldehyde or urea-formaldehyde polymer. Other polymers which have been found to be suitable for use as polymers include polyamides and polyurethanes.

The abrasive particles 18 can be any of a wide variety of such material known for this use. The abrasive particles will typically vary in size from smaller than about 1 micron for extra fine polishing to larger than 30 mesh for extra coarse abrading. Examples of useful abrasive mineral which may be utilized include flint, emery, garnet, aluminum oxide, diamond, alumina-zirconia and silicon carbide.

Figure 1:
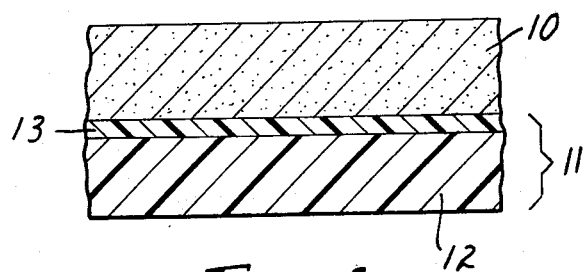
FIG. 1 depicts an adhesive coated tape as an article according to the invention.
Figure 4:
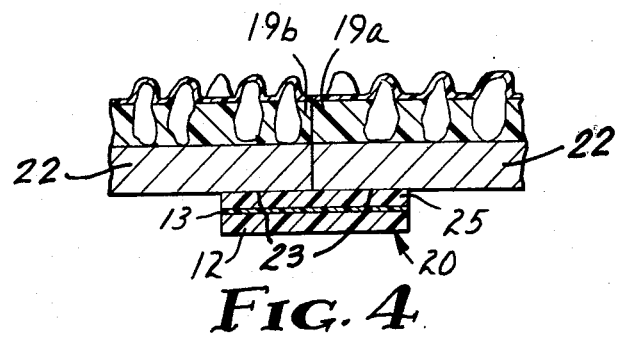
FIG. 4 depicts a butt splice made utilizing a butt-splicing tape according to the invention.

FIG. 4 illustrates a butt-splicing tape 20, in accordance with the invention, resembling the pressure-sensitive adhesive tape depicted in FIG. 1 except that for layer 10 is substituted thermosetting adhesive layer 25. The thermosetting adhesive is capable of being formed as a self-supporting layer and, upon suitable heating, will soften and subsequently cure to a tough infusible crosslinked product. Suitable thermosetting adhesives for this purpose include polyurethanes and nylon/epoxy resin mixtures. Thermosetting adhesive layer 25 is adherently bonded to the surface of the polyester adhesion-promoting layer 13 of the coextruded support film 11.

A splice assembly, in accordance with the invention, is depicted in FIG. 4, utilizing the butt-splicing tape described above. Abrasive sheet material ends 19a and 19b are butted together and joined by tape 20 which is bonded to their non-abrasive surface or back side, the tape extending a sufficient distance on each side of the abutment of the joined ends 19a and 19b to provide an adequate area of contact and to produce a strong bond. This distance will typically be on the order of from ¼ inch to 2 inches on each side of the splice, although longer distances may be desired in some situations.

The butt-splicing tape 20 is applied with sufficient heat and pressure to cause intimate contact of the thermosetting adhesive layer 25 with the surface 23 of the backing sheet 22 of the abutted ends 19a, 19b and to result in the ultimate cure of the thermosetting adhesive. Such heat and pressure may be provided by a conventional platen press or other suitable device.

The splicing tape made in accordance with the invention has proved effective for joining coated abrasive sheet material having backing of drills cloth, other types of fabric, paper, or polymeric film.

It should be noted that a butt splice in accordance with the invention can be prepared by applying support film 11 directly to the back of the abutted ends of the abrasive sheet, after first coating these ends with a suitable thermosetting adhesive. That is, the splice can be made with a splicing tape which is effectively formed in situ. Similarly, per se, the thermosetting adhesive may be in the form of a selfsupporting film which is interposed between the appropriate surface of support film 11 and the back surfaces of the abutted ends of the abrasive sheets. These same sequences may be followed for any other article made according to the invention.

It should also be noted that while the description given above defines a composite article having a support film made of two coextruded polyesters, one being highly crystalline to provide a base layer and the other providing an adhesion-promoting layer, it is also within the scope of the invention to have two layers of the latter integrally formed on either side of the former by coextrusion. Such a support film would have an adhesion-promoting layer on each of its surfaces.

It should be noted further that while certain sheet-like products employing a backing layer and prepared in accordance with the invention have been described above, it is contemplated that other sheet-like products which also utilize a backing layer may also be made in accordance with the invention. For example, the polymeric coating may be a mixture of a magnetically susceptible material, such as that typically utilized in magnetic recording tape, in a suitable binder. When such a mixture is coated upon the surface of the adhesive promoting layer of the coextruded composite backing film, a magnetic recording tape will be provided. Other uses contemplated may be in such products as package wrappings, wall and floor coverings, book coverings, highway signs, photographic film, insulation, clothing such as rain coats, credit and identification cards etc.

The invention is further illustrated by reference to the following examples wherein all parts are by weight unless otherwise specified.

EXAMPLE I

Coextruded Support Film

A 3-mil coextruded support film was prepared as follows:

Granular polyethylene terephthalate resin having a solution intrinsic viscosity of 0.60 and melting point of 250° C was extruded at a barrel temperature ranging from 240°–290° C, a die temperature of 300° C and a feed rate of 90 lbs. per hour, utilizing coextrusion apparatus of the type described above. Simultaneously, a granular copolyester resin having an intrinsic viscosity of 0.61, a melting point of 197° C and consisting of 80/20 poly(ethylene terephthalate/isophthalate was extruded at a barrel temperature ranging from 200° C – 300° C and a feed rate of 25 – 30 lbs. per hour. The resultant molten composite film was cast onto a 12-inch diameter casting wheel maintained at 60° C and rotated at 8 feet per minute, producing a quenched film 30 mils in thickness having a 22 mil thick polyethylene terephthalate layer and an 8 mil thick copolyester layer. The quenched film was then oriented in the machine direction by stretching between a series of idler nip rolls having outlet nip rolls operated at three times the speed of inlet nip rolls while heating the film at 80° C. The uniaxially oriented composite film was then fed into a tenter oven heated at 95° C wherein it was stretched 3 times in the transverse direction. The biaxially oriented composite film was heat-set by briefly heating under restraint at 205° C.

A butt-splicing tape was prepared by first knife coating the copolyester surface of the support film described above to a uniform thickness of 15 mils (wet) with a coating solution, as follows:

| Ingredients | Parts by Weight |
|---|---|
| Adipic acid-ethylene glycol-polyester-diisocyanate reaction product having hydroxy functionality, as a 22 % solids solution in ethyl acetate, the reaction product being described further in U.S. Pat. No. 2,919,408. | 100 |
| Triphenyl methane triisocyanate, as a 20 % solution in methylene chloride, | 7 |

The coated support layer was permitted to dry by solvent evaporation for about 3 hours at room temperature until a 3 thick non-tacky coating of thermosetting adhesive resulted, producing the butt-splicing tape.

A strip of the butt-splicing tape, ¾ inch by 6 inches, was utilized to splice two sheets of aluminum oxide coated abrasive drills cloth sold under the trade designation "Three-M-Ite" by the 3M Co. The splice was prepared by first abutting the ends of the abrasive cloth, with the abrasive surfaces facing one way, and overlaying the butt-splicing tape with its adhesive coated surface overlapping the juncture of the abutted ends and against the back surface (non-abrasive side) of the abrasive coated sheet. This assembly was then placed between the bars of a conventional belt splicing press having its bars maintained at 250° F, first at substantially no pressure but with contact to pre-cure the adhesive coating and then under a pressure of from about 1 to 2 tons per inch of splice length to substantially completely cure the adhesive.

The bonded assembly was then removed from the press for bond strength testing. For this purpose, a non-adherent (about 1 by 1 inch) silicone treated paper was previously inserted between one end of the butt-splicing tape and its adjacent backing surface to prevent adherence. The abrasive face of the abrasive sheet was clamped into one sample holding jaw of an "Instron" tensile testing device. The non-adhered end of the tape was then clamped into the remaining sample holding jaw and the tape was pulled at an angle of 90° with respect to the surface of the abrasive sheet backing, until the support film delaminated or tore or the adhesive peeled from the abrasive cloth or its support film. In this instance, the adhesive bond was stronger than the support film and the support film tore.

Utilizing the same thermosetting adhesive, coating, sealing and testing techniques, butt-splicing tapes were prepared using the support films identified in Table I below as Control Examples "A" and "B" and Examples 2–8. Peel strengths of these Examples are shown in Table I. Control Example "A" was untreated biaxially oriented, heat-set polyethylene terephthalate. Control "B" was biaxially oriented, heat-set polyethylene terephthalate film primed on one surface with parachlorophenol according to the disclosure of Krogh et al. U.S. Pat. No. 3,607,354, and coated over the primed surface with the themosetting adhesive described above. Examples 2–8 employed, as a support film, a coextruded film consisting of a polyethylene terephthalate layer and a layer of the copolyester identified in Table 1.

TABLE I

| Example No. | Support film thickness (mils) | Copolyester layer | Copolyester layer thickness (mils) | 90° Peel strength (lb/in) |
|---|---|---|---|---|
| Control A | 3 | none | none | 2 – 4 |
| Control B | 3 | none | none | 4 – 8 |
| 2 | 1½ – 2 | 80:20 PET:PEID[2] | 0.25 | 15 – 16 |
| 3 | 1½ – 2 | 80:20 PET:PEN | 0.25 | 13 – 17 |

TABLE I-continued

| Example No. | Support film thickness (mils) | Copolyester layer | Copolyester layer thickness (mils) | 90° Peel strength (lb/in) |
|---|---|---|---|---|
| 4 | 2 | 80:20 PET:PEH[3] | 0.25 | 9 – 12 |
| 5 | 1½ – 2 | 80:20 PET:DHMT[4] | 0.25 | 13 – 17 |
| 6 | 3 | 80:20 PET:PEI[1] | 0.25 | >12[5] |
| 7 | 3 | 80:20 PET:PEI[1] | 0.50 | >12[5] |
| 8 | 3 | 80:20 PET:PEI[1] | 1.0 | >12[5] |

[1]polyethylene isophthalate
[2]polyethylene 1,1,3-trimethyl-5-carboxy-3-[p-carboxyphenyl] indane
[3]polyethylene hexahydroterephthalic acid
[4]poly hexamethylene glycol terephthalate
[5]support layer tore rather than adhesion failure As can be seen in Table I, Examples 2–8 had excellent peel strengths in excess of 9 lbs. per inch, while untreated polyethylene terephthalate had very low peel strengths of from 2 to 4 lbs. per inch. Primed polyethylene terephthalate had a peel strength of 4 to 8 lbs. per inch. As can be seen, butt splices prepared according to the invention have peel strengths of 9 to 17 lbs/in.

EXAMPLES 9–17

To demonstrate the significance of the composition of the polyester adhesion-promoting layer of the coextruded support film, Examples 9–17 were prepared. The polyester adhesion-promoting layers selected for this demonstration were made from polyesters having various mole ratios of isophthalate to terephthalate. These examples are tabulated below in Table II which set forth, opposite the appropriate example number, the support film thickness, the percent polyethylene isophthalate (% PEI) in the polyester adhesion-promoting layer (with the remainder of the 100% being PET) and the adhesion-promoting polyester layer thickness. The base layer of the support film in each of these examples was PET.

Control Examples C and D shown in Table III were prepared by solvent casting the polyester compositions noted therein from a 5% solids hot (near boiling) dioxane solvent solution to produce a 0.1 mil (dry) coating on a 1 mil thick biaxially oriented heat-set polyethylene terephthalate film. The solvent coated samples were dried for a period of at least 24 hours prior to testing. Control Example A (biaxially oriented heat-set polyethylene terephthalate, with no surface treatment) and Control Example B (biaxially oriented heat-set polyethylene terephthalate which was primed with para-chlorophenol) are described in Example 1.

TABLE II

| Example | Total thickness (mils) | %PEI | Polyester layer thickness (mil) |
|---|---|---|---|
| 9 | 2–3 | 100 | 0.25 |
| 10 | 2–3 | 95 | " |
| 11 | 2–3 | 75 | " |
| 12 | 3 | 50 | " |
| 13 | 1 | 30 | " |
| 14 | 6 | 20 | " |
| 15 | 1 | 15 | " |
| 16 | 1 | 10 | " |
| 17 | 1 | 5 | " |

TABLE III

| Control Example | Total thickness (mils) | % PEI | Polyester layer thickness (mil) |
|---|---|---|---|
| A | 3 | none | none |
| B | 3 | none | none |
| C | 1.1 | 50 | 0.1 |
| D | 1.1 | 20 | 0.1 |

The support films described in Tables II and III were coated with the thermosetting adhesive composition described in Example 1, using the coating techniques and drying conditions also described therein. Upon drying, two films were adherently bonded with application of heat and pressure to cause the thermosetting adhesive to cure. The bonded films are described in Table IV by the Example identifications used in Tables II and III; e.g., "10—10," means Example 10 film bonded to Example 10 film and "11—14" means Example 11 film bonded to Example 14 film. Bonding was always between polyester adhesion-promoting surfaces (if the film had one) or to the primed surface of PET, unless otherwise specified.

TABLE IV

| Films | 90° Peel strength (lb/in) | Failure |
|---|---|---|
| A–A | <1 | adhesive to film |
| 9–9 | >12 | film tore |
| 9–14 | 6.5 | adhesive split |
| 10–10 | >12 | film tore |
| 10–14 | 6.5–8 | not determinable |
| 11–11 | >12 | film tore |
| 11–14 | 6.5–8 | not determinable |
| 12–12 | >12 | film tore |
| 12–14 | 7 | not determinable |
| 13–13 | >12 | film tore |
| 13–B | 1–2 | adhesive to B |
| C–B | <1 | adhesive to C |
| D–D | <1 | adhesive to D |
| 14–14 | 23–25 | adhesive split |
| 14–B | 1–2 | adhesive to B |
| 15–15 | >12 | film tore |
| 15–B | 1–2 | adhesive to B |
| 16–16 | >12 | film tore |
| 16–B | 1–2 | adhesive to B |
| 17–17 | <1 | adhesive to film |
| 17–B | <1 | adhesive to film |
| A–B | <1 | adhesive to A |

The results of the testing of the film sets described above revealed that films prepared according to the invention, i.e., Examples 9–16, all formed strong adherent bonds with each other. Control Example A formed a very weak bond with whichever film it was bonded to, as did Control Examples B–D. Control Examples C and D, which were prepared by solvent casting, failed quite easily during testing, unlike the films according to the invention.

By way of establishing a useful composition range of the polyester adhesion-promoting layer, testing of Examples 9–17 reveals that in the polyesters containing on a mole basis from 10% to 100% isophthalate, with the remainder being terephthalate, provided strong adherent bonds. A copolyester comprised of 5% isophthalate and 95% terephthalate, i.e., Example 17, on the other hand, acted much as 100% terephthalate, i.e., Control Example A, providing a very weak bond.

Examples 18–20 and Controls E–J
Pressure-Sensitive Adhesives

| Type | Abbreviation | Description |
|---|---|---|
| Polyurethane | U | Prepared as described in Example 8 of U.S. Pat. No. 3,796,678, incorporated herein by reference. |
| Acrylate latex | AL | 95/5 isooctylacrylate/acrylic acid copolymer, 48 % solids. |
| Acrylate | A | 95:5/4.5 isooctylacrylate/acrylic acid copolymer prepared according to U.S. Re. Pat. No. 24,906. |

Pressure-sensitive adhesive (hereinafter sometimes called "psa") tapes were prepared by coating the pressure-sensitive adhesives described above on the backings identified in Table V below. The acrylate psa was knife coated from a 22% solids solution of 70/30 (weight) heptane/isopropanol to provide a 1–2 mil thickness after drying for 24 hours at room temperature. The polyurethane adhesive was knife coated to a thickness of 3 mils and permitted to dry for 24 hours, prior to testing. The acrylate latex adhesive was coated to a thickness of 3 mils and permitted to dry for 24 hours. Coatings were always made on the copolyester surface of a coextruded film or on the primed surface of PET, depending on the backing being utilized. The backings were 3 mils thick.

TABLE V

| Ex. | Backing | PSA | 180° Peel (lb/in) | Failure |
|---|---|---|---|---|
| 18 | 80:20 PET:PEI[1] | U | 5.6 | 10–30 % transfer; remainder split |
| 19 | " | AL | 7–9 | transfer |
| 20 | " | A | 3[4] | adhesive split |
| E | Primed PET[2] | U | 4–4.7 | 50 % split; 50 % transfer |
| F | " | AL | 4.4–5.2 | no split; 50 % transfer |
| G | " | A | 1.5–3[4] | adhesive split |
| H | PET[3] | U | 3 | 95 % transfer |
| I | " | AL | 4.7–5.5 | 50–100 % transfer |
| J | " | A | 1.5–3[4] | adhesive split |

[1]Example 7
[2]Control Example B
[3]Control Example A
[4]90° Peel strength of a psa tape to the same psa tape.

Testing

The psa tapes described as Examples 18–20 and Controls E-J in Table V above were tested for 180° peel strength using the "Instron" tensile testing device described in Example 1. Before testing the tapes had been conditioned for 3 hours at 50% relative humidity and 70° F. A sample of each tape (1 by 6 inch) was applied to the surface of an anodized aluminum plate (which had been first degreased with methylethyl ketone) by placing the tape with its adhesive side against the plate and passing a 4 lb. rubber roller twice over its length, taking care to avoid adhering a 1 inch portion of one end of the tape. The free end of the tape was doubled back over the adhered portion of the tape and one end clamped in one jaw of the "Instron" testing device, the plate in the other jaw, and the end pulled over the tape at 180°. The force required to remove the tape from the plate was recorded. The type of failure was also noted, i.e., whether the adhesive remained on the aluminum plate (transferred), cohesively failed (split) or remained on the backing.

EXAMPLE 21

An abrasive sheet was prepared in accordance with the invention by coating a 7-mil biaxially oriented heat-set support film consisting of a 6.75-mil polyethylene terephthalate layer and a 0.25-mil copolyester layer having a terephthalate/isophthalate ratio of 80/20 with grade 150 aluminum oxide abrasive particles at a particle density of 42 grains per 24 square inches. The abrasive sheet was prepared by first roll coating the copolyester surface at 6.5 grains (dry weight) per 24 square inches with a uniform make coating of phenol-formaldehyde (1:1.95 mol ratio) base catalyzed resin, electrostatically depositing the abrasive particles, precuring the resin at 190° F for 4 hours, and roll coating the resultant coated abrasive surface with the same resin to provide a 11.4 grains (dry weight) per 24 square inch size coating. The size coating was then precured at 190° F for 2 hours and the resultant coated abrasive sheet was drum cured for 10 hours at 212° F.

The abrasive sheet described as Example 21 was evaluated against Control Examples K–M which were prepared of common commercial materials. For each of Examples K–M, as for Example 21, the abrasive mineral was grade 150 aluminum oxide, coated at the mineral weights shown in Table VI. Control K had an "E" weight paper backing, a glue make coating and phenolic resin size coating (same phenolic resin as Example 21). Controls L and M had cloth backings and a make and size resin coating of filled phenolic resin.

A test belt, (3 inches wide by 84 inches long) was prepared from each coated abrasive test Example described above. Each test belt was entrained around a smooth-surfaced 14 inch diameter 3 inch wide rubber-covered contact wheel, the rubber having a hardness value of 80–85 (Shore A). The belt was operated at a speed of 7300 surface feet per minute. A previously weighed 2 by 2 by 7 inch mild steel (1018) work piece was reciprocally urged against the abrasive belt with 19 pounds force, its 2 by 7 inch face being abraded. The test was discontinued after 3 minutes of abrasion, the bar cooled to room temperature, cleaned and weighed. Abrading was continued for an additional period of 3 and 6 minutes respectively and the cooling, cleaning and weighing repeated. Results, which reveal the abrasive sheet material prepared according to the invention to be substantially as good as such sheets prepared of common commercial materials, are shown below:

TABLE VI

| Example | Mineral Wt. per 4 × 6 (grains) | Weight Loss (g) per cut time (min) | | |
|---|---|---|---|---|
| | | 3 | 6 | 12 |
| 21 | 42 | 103 | 180 | 319 |
| Control K | 40 | 87 | 166 | 299 |
| Control L | 62 | 111 | 221 | 366 |
| Control M | 54 | 105 | 203 | 359 |

EXAMPLE 22

Twelve parts of a mixture consisting of one part of 3 micron diamond particles and 1.4 part of the phenolic resin described in Example 21 was blended with 88 parts of ethyl cellosolve to make a slurry which was knife-coated (1.5 mil knife opening) on the surface of the coextruded 3 mil polyester support film described in Example 1. The resultant coating was cured for 1 hour at 250° F to provide a coated abrasive layer which could not be stripped from the backing by scraping with a sharp edge without destruction of the support film. The same coating applied to the previously described parachlorophenol-primed PET backing delaminated easily and cleanly when scraped with a sharp edge.

EXAMPLE 23

A coated abrasive sheet having an epoxy resin binder and 3 micron diamond abrasive particles was prepared according to the invention. The epoxy resin was a 50:50 mixture of (1) a linear polyamide resin condensation product of dimeric fatty acid with a polyamine having an amine value of 290-320 (sold under the trade designation "Versamide 125") and (2) an epoxy resin of the bisphenol A type having an epoxy equivalent of 180-195 (sold under the trade designation "Epon 828").

One part diamond particles was mixed with 1.4 parts resin, as a slurry, which was knife coated (1.5 mil knife opening) on a 3 mil coextruded polyester film of the type described in Example 1. The resultant coating was cured by heating at 125° F in a forced air oven for 8 hours.

The resultant coated abrasive sheet material was used to hand lap a tungsten carbide block. The scrape test described in Example 22 failed to dislodge the epoxy coating of the abrasive sheet described above while the same epoxy easily stripped from a primed PET film surface.

EXAMPLES 24-27

Coextruded support films (each 1 mil in total thickness with an adhesion-promoting layer about 0.25 mil thick) were prepared by the procedure described in Example 1. In each case, the base layer was PET.

Composite articles identified herein as Examples 24-27, were prepared with each support film, using the thermosetting adhesive composition and coating, testing and other related techniques described in Example 1. Testing revealed that for each example, the bond strength was excellent but the film was too thin for adequate evaluation on the "Instron" testing device. The adhesion-promoting layers of the support films are described below adjacent the example number of the composite article:

| Ex. No. | Description of adhesion-promoting layer |
|---|---|
| 24 | 90:10 PET:sebacate |
| 25 | 80:20 PET:polyoxyethylene polyol[1] |
| 26 | 80:20 PET:dimethyl orthophthalate |
| 27 | 80:20 PET:1,4-cyclohexane dimethanol |

[1]Sold under the trade designation "Carbowax 200"

Examples 28-31 and Controls N and P

TABLE VII

| Ex. No. | Base Layer | Adhesion-promoting layer | 90° Peel (lb/in) | Failure |
|---|---|---|---|---|
| 28 | PCDT | 80:20 PET:PEI | 10 | film tore |
| 29 | PEN | 80:20 PET:PEI | 10 | film tore |
| 30 | PEN | 80:20 PET:PEN | 10 | film tore |
| 31 | PEN | 100 % PEI | 10 | film tore |
| N | PEN | none | 1 | adhesive to PEN |
| P[1] | PET | PCDT | 1 | delamination of support film |

[1]Total thickness 1 mil.

Additional butt splice tapes, identified as Examples 28-31 and Control Example N in Table VII above, were prepared and evaluated as hereinbefore described. The support films were 1-2 mils unless otherwise specified and prepared according to the description given in Example 1, using the same coating and drying techniques.

Evaluation as butt-splicing tapes was according to the description given in Example 1, using the same abrasive sheet material and 90° peel strength test with the "Instron" testing device. Table VII above, showing the results, reveals that splice tapes made according to the invention, i.e., Examples 28-31 had excellent peel strengths in excess of 10 lb/in. Control N, on the other hand, prepared of PEN, a material herein described for the support film base layer, has poor adhesion to the adhesive composition. Example P, prepared by coextruding PET and PCDT, both materials herein defined for the base layer, easily delaminated, failing to provide an adequate supporting film.

EXAMPLE 32

A coated abrasive sheet material was prepared using, as a backing layer, the 3 mil coextruded support film described in Example 1. The make coat (3 grains per 4 × 6 inch) and the size coat (6 grains per 4 × 6 inch) were urea-formaldehyde resin, with 12 grains per 4 × 6 inch of 220 grade aluminum oxide abrasive particles and a supersize of zinc stearate applied as a 26% solids zinc stearate solution in glycol to a reflectance of 1000 (as described in U.S. Pat. No. 3,043,673, incorporated herein by reference).

The resultant coated abrasive sheet was utilized for the removal of paint and primer with excellent results.

EXAMPLE 33

A coated abrasive sheet material was prepared, using the 3 mil coextruded support film described in Example 1. The film was coated with an epoxy varnish make coat, 12 grains per 4 × 6 inch grade 400 silicon carbide abrasive grains and 8 grains per 4 × 6 inch alkyd varnish size coat. Enamel was easily removed from a panel with the resultant coated abrasive sheet.

What is claimed is:

1. Composite coated sheet material comprising, in combination:
    1. a biaxially oriented and heat-set coextruded support film consisting essentially of (A) a base layer of dimensionally stable crystalline first polyester selected from the group consisting of polyethylene terephthalate, polycyclohexane dimethyl terephthalate and polyethylene naphthalate (B) an adhesion-promoting layer having a thickness from about one-fourth of the total thickness of said support layer to about 1 mil thick of a second polyester having a minor degree of crystallinity between about 20° C and 230° C and melting at a temperature less than about 230° C wherein said adhesion-promoting layer is a polyester produced by the condensation reaction of a dicarboxylic acid component consisting of from about 10 to about 100 mole percent of a dicarboxylic acid selected from the group consisting of isophthalic acid, hexahydroterephthalic acid, sebaic acid, succinic acid, adipic acid, azelaic acid, suberic acid, pimelic acid, glutaric acid or mixtures thereof, or the diesters of such acids and correspondingly from 90 to zero mole percent of terephthalic acid, and a glycol component, in substantially equimolar proportions with the dicarboxylic acid component, wherein the glycol component is selected from the group consisting of polymethylene glycol of the formula $HO(CH_2)_n OH$, wherein $n$ is an integer of 2–10, neopentyl glycol, 1,4-cyclohexane dimethanol and bisphenol A; and 2. a coating of polymeric material firmly adherently bonded to the face of said (B) layer.

2. The article of claim 1 wherein said polymeric material is selected from the group consisting of polyurethane, ethylene:vinyl acetate polymer, acrylate polymer, phenolic resins, phenolic/rubbery resin mixtures, epoxy resins, vinyl chloride/vinyl acetate polymer compositions, styrene/acrylonitrile polymer compositions, and cellulose acetate butyrate polymer compositions.

3. The article of claim 1 wherein said polymeric material is a pressure-sensitive adhesive.

4. The article of claim 3 wherein said pressure-sensitive adhesive is an acrylate/acrylic acid copolymer.

5. The article of claim 1 wherein said polymeric material is a mixture of abrasive particles and binder.

6. The article of claim 5 wherein said binder is a phenolic resin.

7. The article of claim 1 wherein said polymeric material is a thermosetting adhesive.

8. The article of claim 7 wherein said thermosetting adhesive is polyurethane.

9. The article of claim 1 wherein said polymeric layer is a light-sensitive layer.

10. A composite coated sheet material comprising, in combination:

1. a biaxially oriented and heat-set coextruded support film consisting essentially of a dimensionally stable crystalline polyethylene terephthalate base layer and an adhesion-promoting layer having a thickness from about one-fourth of the total thickness of said support film to about 1 mil thick of poly(ethylene isophthalate/terephthalate), wherein the terephthalate:isophthalate molar proportion varies from 100% isophthalate and correspondingly no terephthalate to 10% isophthalate and correspondingly 90% terephthalate and

2. a coating of polymeric material firmly adherently bonded to the face of said adhesion promoting layer.

11. The composite coated sheet material of claim 10 wherein said isophthalate molar proportion is 20% and said terephthalate molar proportion is correspondingly 80%.

12. A composite coated sheet material of claim 11 wherein the polymeric material is polyurethane.

* * * * *